United States Patent
Vandevelde

(10) Patent No.: US 10,449,586 B2
(45) Date of Patent: Oct. 22, 2019

(54) METHOD AND DEVICE FOR MANUFACTURING A TUBULAR LAGGING ELEMENT FROM SHEET METAL

(71) Applicant: INTERVER MANAGEMENT S.A., Grass (LU)

(72) Inventor: Pierre Vandevelde, Gosselies (BE)

(73) Assignee: INTERVER MANAGEMENT S.A., Grass (LU)

( * ) Notice: Subject to any disclaimer, the term of this patent is extended or adjusted under 35 U.S.C. 154(b) by 59 days.

(21) Appl. No.: 15/308,580

(22) PCT Filed: Apr. 30, 2015

(86) PCT No.: PCT/EP2015/059585
§ 371 (c)(1),
(2) Date: Nov. 2, 2016

(87) PCT Pub. No.: WO2015/166078
PCT Pub. Date: Nov. 5, 2015

(65) Prior Publication Data
US 2017/0072445 A1    Mar. 16, 2017

(30) Foreign Application Priority Data
May 2, 2014   (LU) ......................................... 92 442

(51) Int. Cl.
*B21D 5/14*   (2006.01)
*B21D 5/00*   (2006.01)
(Continued)

(52) U.S. Cl.
CPC .............. *B21D 5/14* (2013.01); *B21C 37/083* (2013.01); *B21C 37/0815* (2013.01); *B21D 5/00* (2013.01);
(Continued)

(58) Field of Classification Search
CPC . B21D 5/14; B21D 53/06; B21D 5/12; B21D 17/04; F16L 37/02; F16L 9/17; B21C 37/083; B21C 37/0815
See application file for complete search history.

(56) References Cited

U.S. PATENT DOCUMENTS 2,569,962 A * 10/1951 Tinley ...................... B21D 5/14
                                                        72/13.6
3,858,785 A    1/1975 McLain
(Continued)

FOREIGN PATENT DOCUMENTS

EP        1213063 A2    6/2002
EP        1518616 A2    3/2005
(Continued)

OTHER PUBLICATIONS

International Search Report dated Jul. 29, 2015 re: Application No. PCT/EP2015/059585; pp. 1-2; citing: US 3 858 785 A, US 3 921 883 A and FR 2 566 094 A1.

*Primary Examiner* — Rick K Chang
(74) *Attorney, Agent, or Firm* — Cantor Colburn LLP

(57) ABSTRACT

The apparatus for manufacturing a tubular, sheet metal heat-insulating element (1) from a sheet metal blank (9) successively comprises, in a direction of travel perpendicular to the axis of the heat-insulating element to be produced, a drive unit (5) for conveying the blank (9) flat in the direction of travel (F), a set of shaping rolls (61, 62) comprising shaping rollers (65, 66) for forming a relief on the edge of the blank, and a roll-bending unit (7), situated immediately downstream of the set of shaping rolls, for roll-bending the blank comprising said relief. Firstly, reliefs are shaped on the edges of the blank by means of shaping rolls, then roll-bending is performed, preferably immedi- (Continued)

ately thereafter and in the same operation, the edge-forming and roll-bending being carried out in a single pass.

6 Claims, 4 Drawing Sheets

(51) Int. Cl.
    *B21C 37/08*     (2006.01)
    *B21D 5/12*     (2006.01)
    *B21D 17/04*     (2006.01)
    *B21C 37/083*     (2006.01)
    *F16L 9/17*     (2006.01)
    *F16L 37/02*     (2006.01)
    *B21D 53/06*     (2006.01)

(52) U.S. Cl.
    CPC ............... *B21D 5/12* (2013.01); *B21D 17/04* (2013.01); *B21D 53/06* (2013.01); *F16L 9/17* (2013.01); *F16L 37/02* (2013.01)

(56) References Cited

U.S. PATENT DOCUMENTS 3,921,883 A     11/1975   McLain
    5,014,424 A  *  5/1991   Takasugi ............... B21C 37/121
                                                      29/890.149

FOREIGN PATENT DOCUMENTS

EP           1724033 A2     11/2006
FR           2566094 A1     12/1985

\* cited by examiner

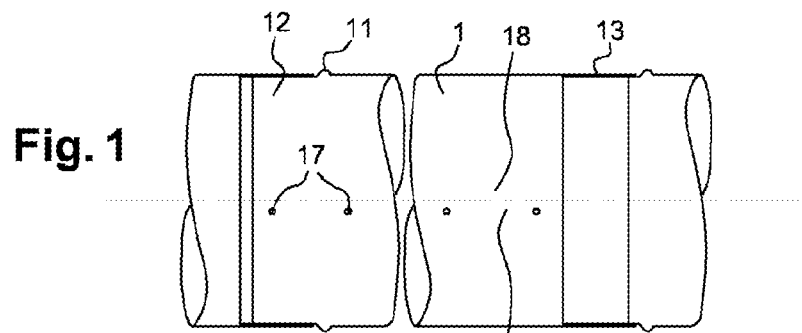
Fig. 1
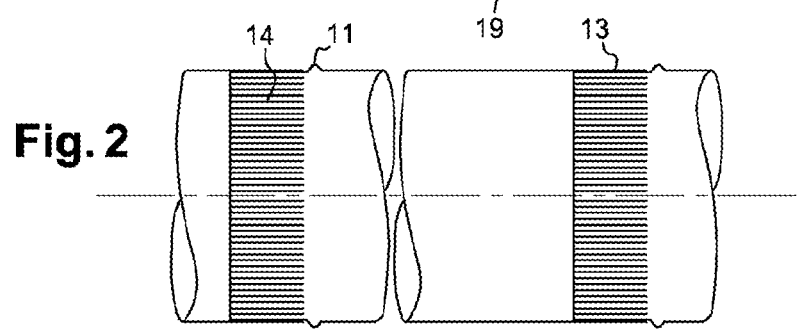
Fig. 2
Fig. 3
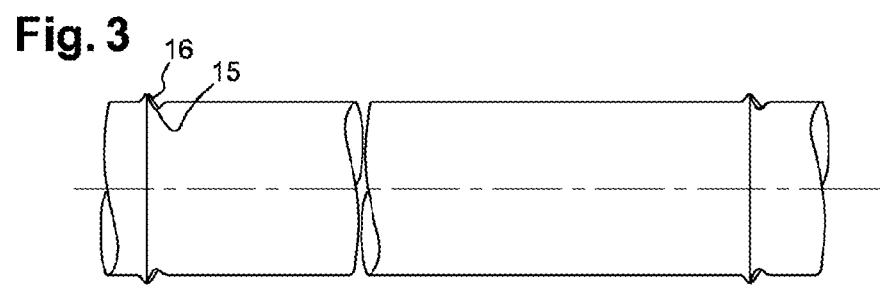
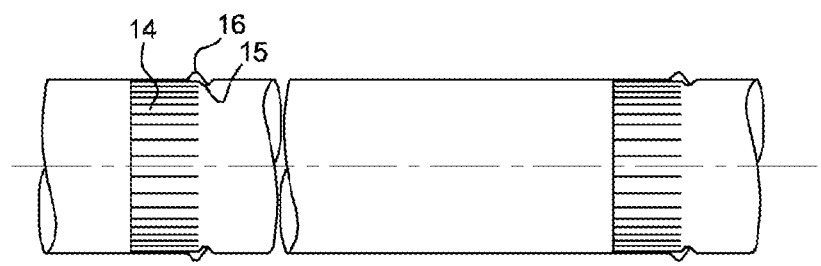
Fig. 4

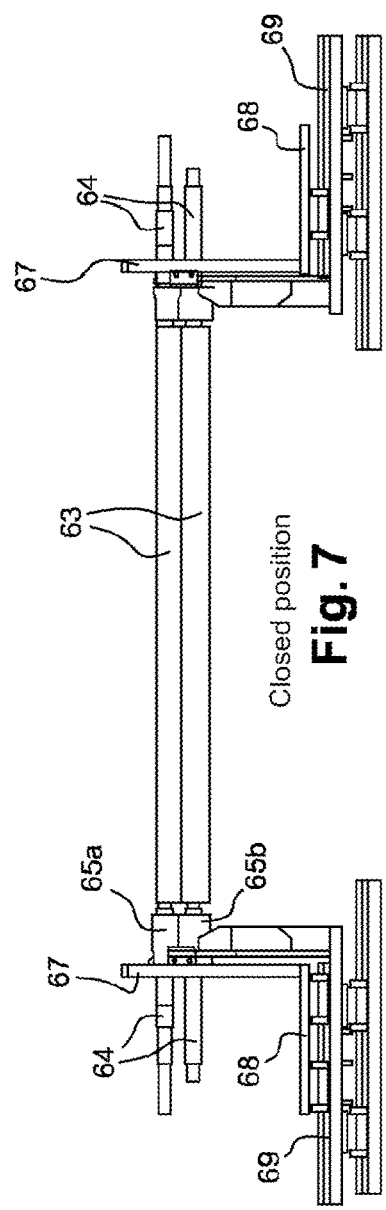
Fig. 7 Closed position
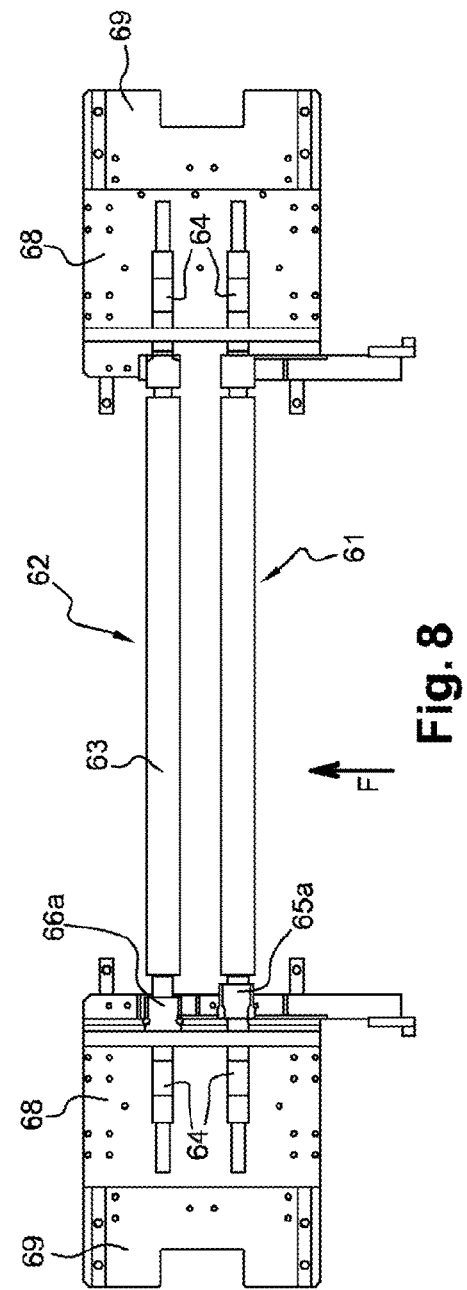
Fig. 8

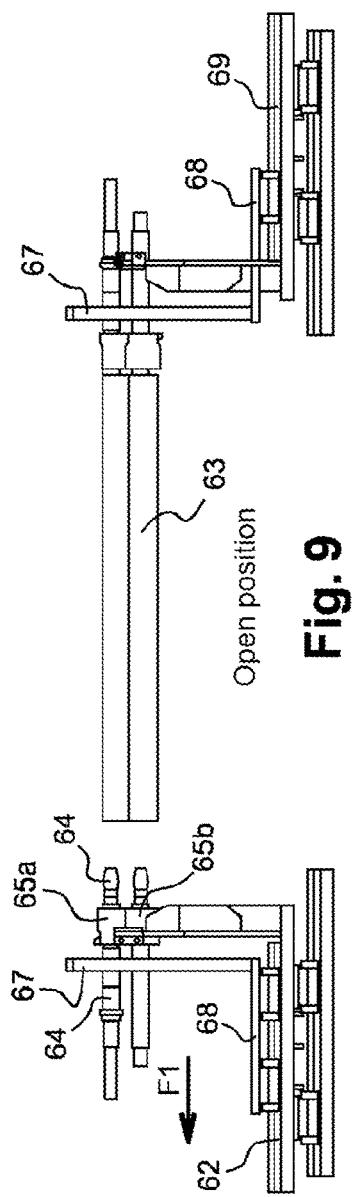
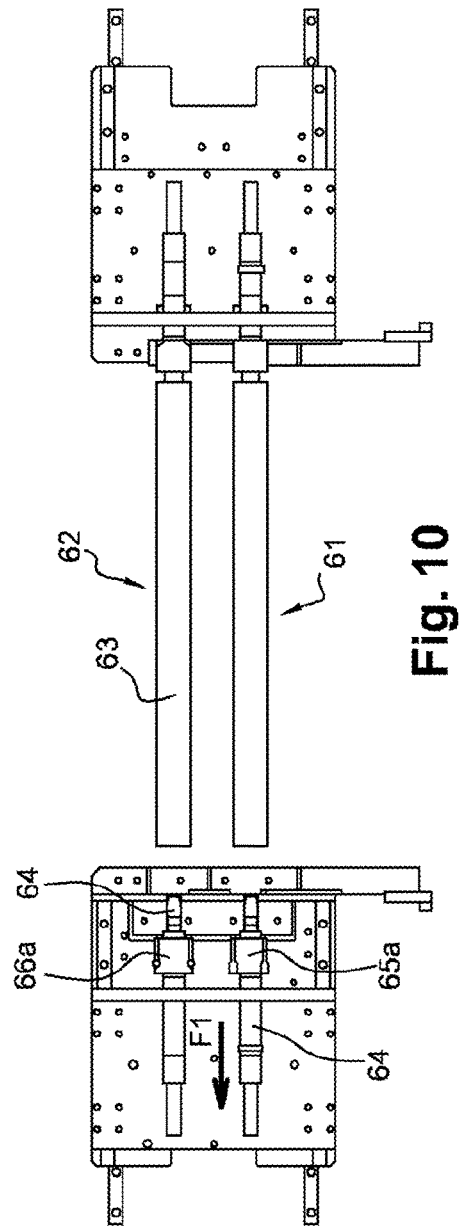
Fig. 9
Fig. 10

US 10,449,586 B2

METHOD AND DEVICE FOR MANUFACTURING A TUBULAR LAGGING ELEMENT FROM SHEET METAL

TECHNICAL FIELD

The present invention relates to a method and a device for manufacturing tubular, sheet-metal heat-insulating elements that will be designated hereinafter also as pipes or shells.

BACKGROUND

Such elements, typically cylindrical in form and of lengths of the order of 1000 or 1250 mm, commonly also known as "sections", are used for heat insulation of heat-transfer fluid ducts. They consist of a punched rectangular sheet-metal blank, which is then roll-bent, remaining open along a generating line, so as to be capable of lateral insertion around the duct to be heat-insulated. The two opposing longitudinal edges are then joined together, by means of machine bolts for example. Furthermore, the axial ends of these heat-insulating elements are shaped such that the elements can be fitted together by push-fitting. The general principle used for fitting together in a straight line is push-fitting using male and female moldings, this push-fit being capable of ensuring good water-tightness and sufficient rigidity, be it for installation in a vertical or horizontal position.

Push-fitting of heat-insulating elements may however be implemented using various techniques, some examples of which are illustrated in FIGS. 1 to 4, which show fitted-together pipe elements, each pipe 1 consisting of a rolled blank of sheet metal closed by joining of the longitudinal edges 18, 19. FIG. 1 depicts a push-fit with an embossed peripheral molding 11 towards one smaller diameter end 12 of the pipe 1, the molding constituting a stop when said smaller diameter end is push-fitted inside the opposite cylindrical end 13 of another pipe. FIG. 2 shows a push-fit system which is similar but with necking 14 instead of the "conical shape" of the previous example, this necking being obtained by the formation of axial corrugations distributed over the periphery of the pipe. FIG. 3 depicts a push-fit of the edge-to-edge type, one end comprising a recessed molding 15 formed right at the edge of the pipe, into which is inserted the edge of an embossed molding 16 formed on the other end. FIG. 4 depicts a push-fit of the overlapping type, with one end comprising necking 14 and corrugations and a recessed molding 15 at the boundary of the necking, and the other end of the pipe being inserted over said necking and additionally comprising an embossed molding 16, the edge of which is inserted into said recessed molding.

In every case the moldings or corrugations formed towards the axial ends of the elements create deformation of the entire thickness of the sheet, which has furthermore to remain smooth and without deformation between these deformed end zones.

The material of the sheets used to manufacture these pipes largely depends on the application. They may in particular be of aluminum, prepainted steel, stainless steel or electroplated steel, the thickness of the sheet generally varying between 0.4 and 1 mm.

Currently, manufacture of heat-insulating elements from sheets supplied in coils comprises the following series of steps:

A) cutting the blank to size (width 1000-1250 mm, length=diameter*π+overlength for overlap), B) punching the blank to form holes for bolts to close the pipe, C) longitudinal molding to form one or two moldings also used for closure purposes, D) rolling, or roll-bending, the sidewall to the diameter required to obtain a shell, using a rolling machine, E) preassembling the shell with bolts to achieve sufficient rigidity, F) shaping the ends, for example with the shapes described above, to allow the pipes to be fitted together end-to-end. Shaping of the ends is performed using an edge-forming machine.

G) removing the bolts to allow the shells to be fitted one inside the other, in particular to reduce bulk during transport.

The operation of shaping the ends is very important and must be performed very carefully by a professional, the depth of the molding and the repeatability of the result being important so as subsequently to ensure uniform assembly and fitting together of the heat-insulating elements.

Edge-forming machines are known, in particular from EP1518616, EP1724033, EP1213063, which are dedicated to this shaping. However, overall, molding shaping operations for the most part remain manual and involve a multitude of operations, causing operators physical fatigue. Likewise, the repeatability of the operations on the edge-forming machine is dependent on the operator, the accuracy of the molding depth being a function in particular of the operator's dexterity.

Furthermore, rolling and molding operations, in which a male side and a female side are produced, bring about deformation of the cylindrical element, one side being under-rolled and the other over-rolled, the heat-insulating elements ultimately being deformed.

These problems are increased further if sheets are used which are difficult to work, such as thick sheets, for example of grade 316 stainless steel up to a thickness of 1 mm, which will require more effort than a thin sheet of aluminum. The loading exerted for the rolling operation and above all the molding operation must be sufficient to achieve the desired deformation. It may consequently be necessary to perform several passes on the edge-forming machine, modifying the settings of the edge-forming machine between each pass to arrive at the desired degree of relief or molding depth.

A further drawback is that there is risk of the surface of the shell or pipe being damaged during the various operations required and in particular in the case of several successive passes in the edge-forming machine. In the case of coated steel blanks, such damage poses an aesthetic problem but also a risk of subsequent corrosion.

Still another drawback is that this method of manufacture requires pre-assembly, with bolting, before end-shaping is performed, and also requires, after shaping, removal of the bolts used for pre-assembly of the edges and disassembly of said edges to package the shells, fitted one inside the other, for transport. Apart from the time loss resulting from these operations, they increase the risk of damage to the surface of the heat-insulating elements.

U.S. Pat. Nos. 3,858,785 and 3,921,883 additionally disclose methods for manufacturing tubes comprising peripheral reliefs, or corrugations, where said reliefs are formed on the sheets prior to the latter being roll-bent to form a tube. However, these tubes are welded tubes, intended for heat exchangers, and either the reliefs are formed on one or two faces but in such a way that the relief on one face has no effect on the other face, as in U.S. Pat. No. 3,858,785, or the corrugations are produced continuously over the entire length of the tube, as in U.S. Pat. No. 3,921,883. Apart from the fact that these tubes, intended for heat exchangers, do not have at all the same features and functionalities as the heat-insulating tubes according to the invention, the reliefs imparted to them do not pose at all the same problems as the heat-insulating elements to which the invention relates, and in particular the manufacturing methods of U.S. Pat. Nos. 3,858,785 and 3,921,883 do not allow the production of tubular elements of which only the ends are shaped to obtain peripheral moldings or corrugations while the part located between these ends remains uniformly smooth without deformation other than that resulting from roll-bending of the sheet to make it tubular.

BRIEF SUMMARY

The disclosure seeks to remedy the above problems and in particular proposes a method and a machine which automate the rolling and molding operations into a single operation, in such a way as to achieve a result exhibiting a high level of invariability, and therefore an improvement in the quality of the manufactured parts. The disclosure also seeks to reduce the operations and time required both for manufacture of the heat-insulating elements and for adjusting the machine settings. The disclosure further seeks to eliminate the over-rolling and under-rolling effect.

The invention in one exemplary embodiment provides a method for manufacturing a tubular, sheet metal heat-insulating element, said element comprising a blank of roll-bent sheet, two opposing longitudinal edges of which are joined together along a longitudinal connecting line, said element comprising a peripheral relief formed on the sheet solely in the vicinity of at least one axial end of the element, comprising an edge of the blank orthogonal to the longitudinal edges, on the periphery of the element, said relief affecting the sheet over its entire thickness.

According to one exemplary embodiment the invention, this method is characterized in that said relief is formed during travel on the edge of the blank (an edge which will subsequently constitute an axial end of the heat-insulating element), the sheet metal blank being held flat and caused to travel between two shaping rolls in a direction parallel to said edge, roll-bending of the blank comprising said relief then being performed by a bending roll cooperating with one of the shaping rolls to roll-bend the blank in a single pass as it exits the gap between the shaping rolls, immediately after shaping the relief during travel of the blank.

According to the prior art, shaping of the ends of the heat-insulating elements is performed after said element has been given its cylindrical shape by rolling and pre-assembly of its longitudinal edges, so causing the problems mentioned above. In contrast thereto, according to an embodiment of the invention the first operations performed are those which impart the desired shaping to the edges of the blank as it is held flat, rolling or roll-bending then being performed in a single pass immediately after shaping of the relief during travel of the blank.

The relief is shaped by passing the blank between two shaping rolls, and roll-bending is performed by a bending roll cooperating with one of the shaping rolls to roll-bend the blank immediately as it exits the gap between the shaping rolls. This arrangement on the one hand allows the use of just one additional roll for the roll-bending operation. On the other hand, given that the shaping operations are performed simultaneously on both sides of the blank by the shapes adapted to this end of the ends of the rolls, it is also possible to perform roll-bending while the moldings formed by the shaping rolls are still in contact with the shaping roll and guided and supported by the shaping roll onto which the blank is partially wound under the roll-bending action.

According to a preferred arrangement, the peripheral relief is formed in at least two shaping steps, comprising a rough-machining step and a finishing step, performed in succession during travel of the sheet, each step being carried out by a set of two shaping rolls. This arrangement makes it possible to produce the reliefs in at least two steps, causing smaller deformations in each step at the edges of the blank, and therefore generating fewer residual stresses in the material of the blank. This reduction in residual stress is favorable when it comes to avoiding overall deformation of the formed pipe and results in a more regular profile and in the elimination of over-rolling, and ultimately in the obtainment of a pipe with identical diameters at the male and female moldings produced respectively at the opposite ends of the pipe. Roll-bending is thus performed virtually simultaneously with shaping of the edges, which avoids or at least limits the risk of deformation of the pipe, such as the above-mentioned over-rolling and under-rolling defects.

Furthermore, the loads required to deform the edges of the blank are smaller, so enabling the use of a less rigid machine, which is therefore less bulky and less expensive. It has also been noted that molding of the ends in a single pass causes distortion of the material and very definite damage to the state of the surface. Working in two passes greatly reduces or completely eliminates this phenomenon.

A significant advantage of the method is that it is perfectly suited even to applications involving significant thicknesses and rigidity.

The method according to an embodiment of the invention allows implementation of the shaping used previously, with the peripheral relief comprising a peripheral molding which is recessed or embossed or necking or corrugation.

An embodiment of the invention also provides an apparatus for manufacturing such a tubular, sheet metal heat-insulating element, characterized in that it comprises in succession, in a direction of travel perpendicular to the axis of the heat-insulating element to be produced,
 a drive unit for conveying the blank flat in the direction of travel,
 a set of shaping rolls comprising shaping rollers for forming the relief on the edge of the blank, and
 a roll-bending unit, situated immediately downstream of the set of shaping rolls, for roll-bending the blank comprising said relief, the roll-bending unit comprising a bending roll mobile transversely of the direction of travel and adjusting means for adjusting the position of the bending roll relative to the shaping rolls.

Preferably, the set of shaping rolls comprises, in succession in the direction of travel, a set of rough-machining rolls and a set of finishing rolls. Taking account of the fact that the loading exerted for the rolling operation and above all the molding operation must be sufficient to achieve the desired deformation, it is advantageous to use at least two sets of shaping rolls acting in succession, which enable a reduction in the loads necessary for plastic deformation of the blank, and therefore in the power and rigidity of the machine, without prejudicing the quality of the moldings and of the finished pipe.

It should be noted that the machine may for example function at an electrical voltage of 220 Volts (single phase) and be mounted on orientable castors. The machine can thus be displaced all around the workshop and plugged into any socket, and can easily be used on site.

According to another preferred arrangement, the shaping rollers are connected detachably to the ends of the shaping rolls. Likewise, the ends of the shaping rolls are supported in bearings mounted on carriages displaceable transversely to enable release of the ends of the rolls to ensure shaping roller interchangeability and/or to enable the use of rolls of different lengths. These arrangements make it possible easily to change the rollers depending on the shaping to be performed, as well as to change the rolls to adapt the length thereof to the width of the blanks. Consequently, the apparatus is easily and quickly adapted to different sheet widths.

In the light of the above, a person skilled in the art will appreciate that the method and apparatus described here benefit from great universality since they are usable for a large number of widths, thicknesses and different types of material.

According to still another arrangement, the bending roll is arranged on a roll-bending support, mobile transversely of the direction of travel between a withdrawn position and a roll-bending position in which the bending roll is brought to the level of the blank travel plane in order to cooperate with a shaping roll from the set of shaping rolls situated the furthest downstream in the direction of travel, in order to roll-bend the blank. Adjustment of roll-bending settings and therefore adaptation thereof depending on the diameter of the tubes to be manufactured are consequently very easy to achieve.

BRIEF DESCRIPTION OF THE DRAWINGS

Other details and features of an embodiment of the invention will be revealed by the detailed description of an advantageous embodiment of the machine and use thereof, given below by way of illustration with reference to the appended drawings in which:

FIGS. 1 to 4, which have already been explained, show various embodiments of molding and shaping performed at the ends of the known heat-insulating elements;

FIG. 7 is a partial front view showing the shaping rolls in their position of use;

FIG. 8 is a view corresponding to FIG. 7, in plan view;

FIG. 9 is a partial front view showing the shaping rolls in the shaping roller replacement position;

FIG. 10 is a view corresponding to FIG. 9, in plan view.

DETAILED DESCRIPTION

Figure 5:
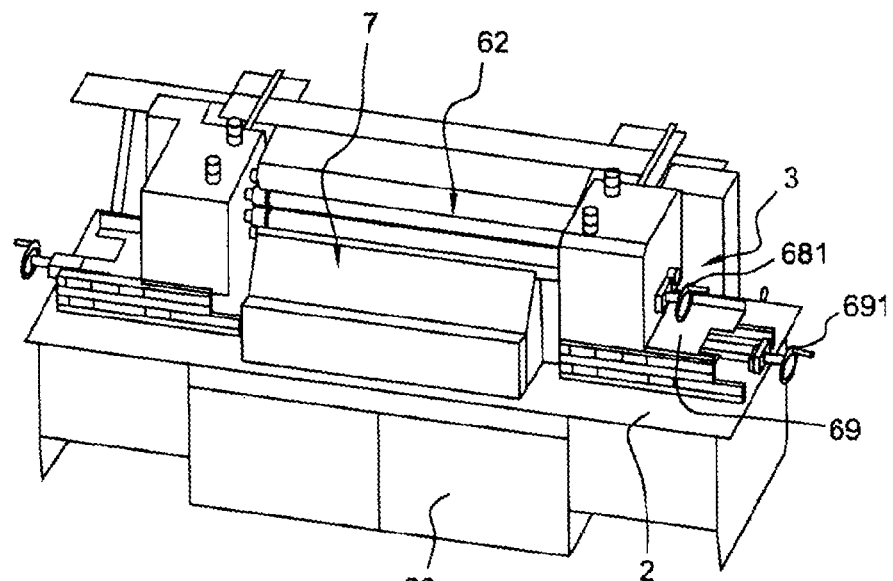
FIG. 5 is an overall view of the machine, being a perspective view from the rolled pipe discharge side.

The machine according to an embodiment of the invention shown in FIG. 5 comprises a base 2 mounted on castors and provided with a casing 20 holding the shaping rollers, and a frame 3 ensuring the rigidity of the machine, placed on the base 2.

The machine further comprises:
 a feed table 4 supported on the frame 3,
 a drive unit 5,
 a set of shaping rolls 6,
 a roll-bending unit 7.

The drive unit 5 comprises a set of motorized pinch rolls 51 for gripping the blanks deposited on the feed table 4 and driving them in the direction of travel, according to the arrow F, towards the set of shaping rolls 6.

The set of shaping rolls 6 comprises two sets of shaping rolls: one set 61 of rough-machining rolls 61a, 61b and one set 62 of finishing rolls 62a, 62b. All these rolls are motorized. Each shaping roll comprises a cylindrical central roll 63, the ends of which are mounted, connected for rotation, on driving half-shafts 64 which also bear, adjacent the ends of the cylindrical rollers, shaping rollers 65a, 65b, 66a, 66b. For each roll, the half-shafts, the shaping rollers and the cylindrical roll are detachably connected for rotation.

The half-shafts driven in rotation by the motors, not shown, are mounted in bearings 67 fixed to upper carriages 68 displaceable in the axial direction of the rolls, the upper carriages themselves being mounted on lower carriages 69 displaceable in said axial direction, as illustrated in FIGS. 7 to 10. As can be seen from FIG. 5, the carriages are guided on slideways and displaceable by means of cranks 681, 691.

The upper carriages 68 may be displaced, moving them apart as represented by the arrow F1 in FIGS. 9 and 10, when a change of shaping rollers, from the 1st or 2nd pass, is necessary. Displacement of the upper carriages 68 makes it possible to disengage the half-shafts 64 relative to the cylindrical rolls 63, as shown on the left in FIGS. 9 and 10, also allowing replacement of the shaping rollers 65, 66. The roller change is very quick thanks to this mobile structure.

The change in position of the lower carriages 69 makes it possible to put in place and use cylindrical rolls 63 of different lengths, adapted to the width of the sheet metal blanks used, typically 1000 to 1250 mm. It will be noted that the possibility of displacing the upper carriages on the lower carriages always enables quick roller replacement whatever the width of the blanks in question, as indicated above.

The rollers are interchangeable, in sets of two paired rollers 65a, 65b; 66a, 66b, one roller 65a, 66a for the upper roll 61a, 62a of each set of rolls, the other roller 65b, 66b for the lower roll 61b, 62b. The profile of the rollers is selected depending on the moldings or other shaping to be formed on the ends of the tubes 1, and the pairs of rollers are also adjusted depending on the deformation to be obtained for each set of rolls, rough-machining and finishing respectively. Typically, for each side there is therefore a set of rough-machining rollers 65a, 65b mounted on the half-shafts at the end of the rough-machining rolls 61 and a set of finishing rollers 66a, 66b mounted on the half-shafts at the end of the finishing rolls 62. With all the rollers being interchangeable, total flexibility of use is provided for the machine, it being possible for example to form on one side of the blank, and therefore on one end of the pipe, necking and a female molding, and on the other side, and therefore the other end of the pipe, another, deeper molding and narrower necking. This constitutes an enormous advantage for a person skilled in the art.

In some cases, in particular in the event of use of blanks of a relatively soft material, for example of aluminum, it is possible to carry out shaping in a single step, by a single set of rollers mounted on the finishing rolls. In this case, rollers of rubber are mounted on the rough-machining rolls, said rollers not serving to deform the blank but merely assisting in the drive and guidance thereof. The advantage of this option is that, for a change in profile of the roll ends, it is possible merely to change the rollers of the finishing rolls, which saves time and increases flexibility of use of the machine.

Figure 6:
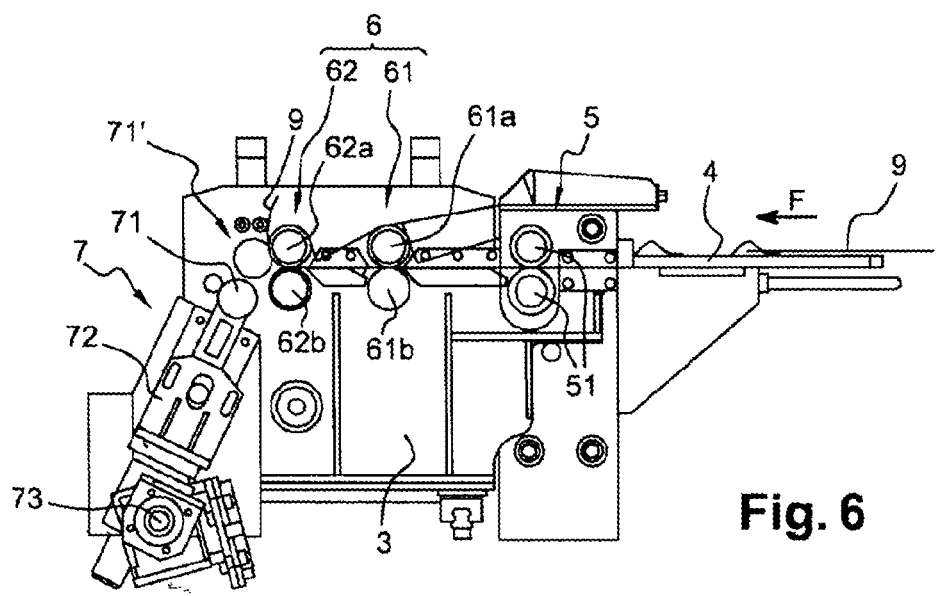
FIG. 6 is a cross-sectional view of the machine.

With reference to FIG. 6, it may be seen that the roll-bending set 7 comprises a bending roll 71 mounted on a carriage 72 mobile transversely of the direction of travel and means 73 for adjusting the position of the bending roll 71 mobile relative to the set of finishing shaping rolls 62, so as to be able to adjust the relative position between the bending roll 71 and the upper finishing roll 62a with which it cooperates to roll-bend the blank, depending on the desired roll-bend radius. As may be seen in FIG. 6, the carriage 72 is mobile in a direction inclined relative to the plane of the blank, in such a way that the bending roll 71 can be positioned as close as possible to the upper finishing roll 62a, which also serves as a blank supporting roll, for roll-bending with a minimal roll-bend radius.

How the machine operates can be easily deduced from the description which has just been given of the machine. To produce a heat-insulating element 1 from a blank precut to the required dimensions, the blank 9 is brought to the feed table 4 and gripped between the pinch rolls 51 of the drive unit 5, which insert the blank between the rough-machining shaping rolls 61a, 61b. The rough-machining shaping rollers 65a, 65b then effect a first deformation of the edges of the blank, which deformation is finished, when the blank then passes between the finishing rolls 62a, 62b, by the finishing rollers 66a, 66b. As soon as the blank exits the gap between the finishing rolls, the blank is pushed upwards by the bending roll 71, shown in the top position by reference sign 71' in FIG. 6, which causes roll-bending of the blank 9 with the desired curvature, set by adjustment of the position of the carriage of the roll-bending unit 7. When the blank has been fully rolled, it is removed from the grip of the shaping and roll-bending rolls, and may be grasped by the operator or a suitable gripping means, ready for use thereof.

The machine according to an embodiment of the invention may be incorporated into a complete production line ensuring prior cutting to size of the blank from sheet metal originating from a coil and the formation of holes for the bolts closing the tubes, and bringing the blank thus prepared to the feed table, manufacture of the heat-insulating elements then being capable of full automation.

The invention claimed is:

1. An apparatus for manufacturing a tubular, sheet metal heat-insulating element, said element comprising a blank of roll-bent sheet, two opposing longitudinal edges joined together along a longitudinal connecting line, said element comprising a peripheral relief formed on the sheet solely in a vicinity of at least one axial end of the element, on a periphery of the element, comprising in succession, in a direction of travel perpendicular to an axis of the heat-insulating element to be produced:
   - a drive unit for conveying the blank in the direction of travel,
   - a set of shaping rolls comprising shaping rollers configured for shaping the peripheral relief on the edge of the blank, and
   - a roll-bending unit, situated immediately downstream of the set of shaping rolls and disposed at an incline relative to a plane of the blank, said roll-bending unit configured for roll-bending the blank comprising said peripheral relief, the roll-bending unit comprising a bending roll mobile transversely of the direction of travel and adjusting means for adjusting the position of the bending roll relative to the shaping rolls.

2. The apparatus according to claim 1, wherein the set of shaping rolls comprises, in succession in the direction of travel, a set of rough-machining rolls and a set of finishing rolls.

3. The apparatus according to claim 1, wherein the shaping rollers are connected detachably to the ends of the shaping rolls.

4. The apparatus according to claim 1, wherein the ends of the shaping rolls are supported in bearings mounted on carriages displaceable transversely to enable release of the ends of the shaping rolls to ensure shaping roller interchangeability and/or to enable the use of shaping rolls of different lengths.

5. The apparatus according to claim 1, wherein the bending roll is fitted on a carriage mobile transversely of the direction of travel.

6. The apparatus according to claim 1, wherein the drive unit comprises a set of pinch rolls.

* * * * *